Dec. 12, 1944.  F. BOTTOMLEY  2,365,046
LIQUID SEAL
Filed Aug. 21, 1943
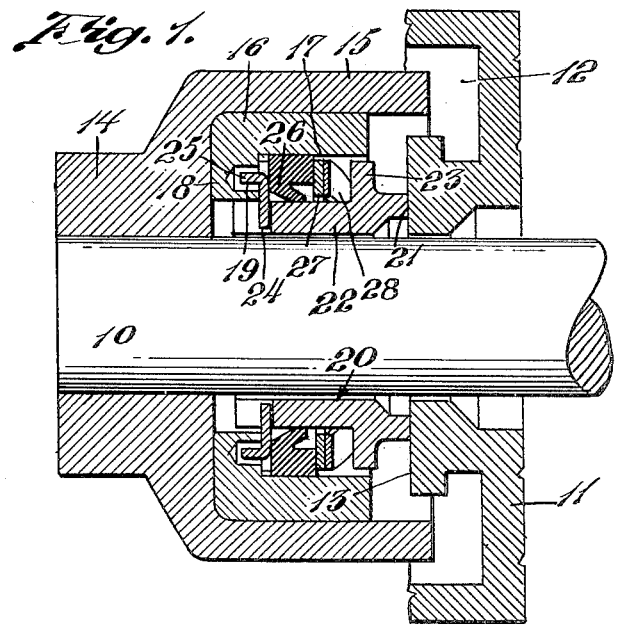
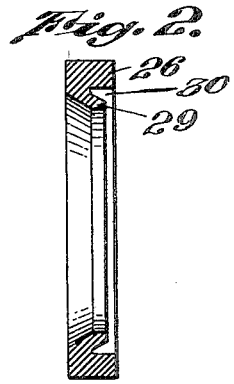
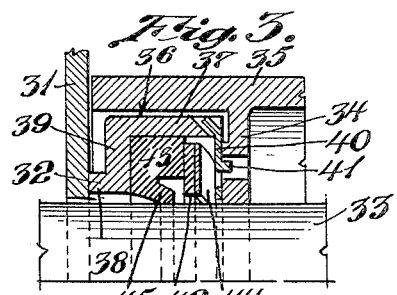
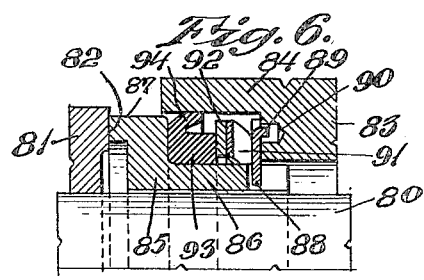
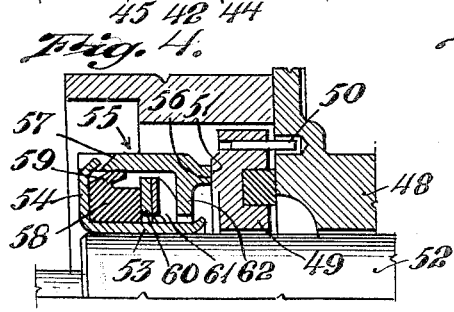
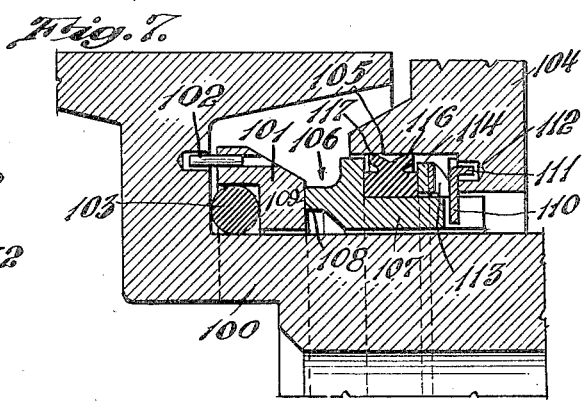
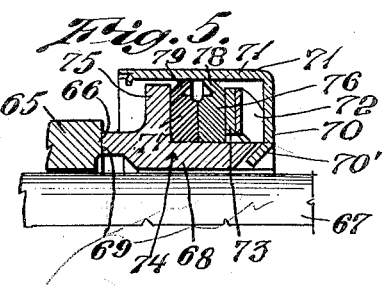
INVENTOR
Frank Bottomley
BY Barlow & Barlow
ATTORNEYS Patented Dec. 12, 1944

2,365,046

UNITED STATES PATENT OFFICE 2,365,046

LIQUID SEAL

Frank Bottomley, Barrington, R. I., assignor to Stevenson Engineering Corporation, a corporation of Rhode Island Application August 21, 1943, Serial No. 499,479

2 Claims. (Cl. 286—7)

This invention relates to a liquid seal between two relatively rotating parts and has to do more particularly with a seal which is effected between an axially moving sleeve and the part of such a combination with which the sleeve is associated.

Heretofore where a seal was provided between two relatively rotating parts one of the parts had an axially movable sleeve and some soft or compressible packing which formed a seal between this axially movable sleeve and the part with which it is associated and with reference to which it axially moves. At times a great deal of pressure has been placed upon such compressible packing causing it to expand and exert considerable friction tending to retard axial movement of the sleeve so that it moved with difficulty.

One of the objects of this invention is to provide a soft packing between the axially movable sleeve and the part with which it is associated so as to reduce or minimize the sealing pressure exerted and consequently reduce any friction exerted against such axial movement.

Another object of this invention is to utilize the pressure of the fluid which is to be sealed to cause the frictional engagement between the axially movable parts so that only such frictional engagement as may be required to seal the fluid under a certain pressure will occur for the purpose of providing this seal.

Another object of this invention is to provide a more easily movable sleeve which performs the sealing function in the combination.

With these and other objects in view, the invention consists of certain novel features of construction, as will be more fully described and particularly pointed out in the appended claims.

In the accompanying drawing:

Fig. 1 is a sectional view illustrating the parts mounted on and associated with the shaft for performing this sealing function;

Fig. 2 is a sectional view of the sealing member which engages the axially sliding sleeve;

Fig. 3 is a fragmental sectional view illustrating a modified arrangement of the parts;

Fig. 4 is a fragmental sectional view illustrating a different modification;

Fig. 5 is a fragmental sectional view illustrating a different modification;

Fig. 6 is a fragmental sectional view illustrating a different modification in which the axially sliding sleeve is associated with the casing rather than the rotating shaft;

Fig. 7 is a fragmental sectional view illustrating a still different modified form in which the sliding sleeve is associated with the casing instead of the relatively rotating member.

In proceeding with this invention the parts are so arranged that there is some axially extending wall or surface spaced from but in generally concentric relation with the axially extending surface of the sealing sleeve. The sleeve has a sealing face which engages the sealing face of the casing and some movement occurs between the sleeve and the part with which it is associated in order that these sealing surfaces may engage and provide the seal. A seal must also be provided between these spaced axially extending cylindrical surfaces which I arrange so that it will be in firm engagement with one of the walls while it has a very flexible lip which is swung by the force of the fluid to be sealed into engagement with the other wall so as to provide a seal between the parts.

With reference to the drawing 10 designates a rotatable shaft while 11 designates a casing which is fixed with reference to this shaft. Liquid is to be maintained within the casing and its contained area 12 and sealed against escape through openings provided for the shaft. The casing has an inwardly extending collar which is provided with a sealing face 13.

The shaft 10 has a cupped flange shrunk thereon or firmly fixed thereto in a manner which will prevent the escape of fluid between the shaft and this flange. This flange has a hub portion 14 with a wall 15 having a bushing 16 therein which provides an axially extending cylindrical inner wall 17 and a bottom wall 18 recessed as at 19 at a plurality of locations annularly thereof. A sealing sleeve 20 has a sealing face 21 to engage the annular ground sealing face 13 of the casing and an axially extending wall 22 spaced from but concentric with the cylindrical wall 17. A spring abutment flange 23 extends between the different diameter portions of the sleeve on either side thereof so that the liquid which is to be sealed will press the sleeve so that its sealing surface 21 will tend to move toward the sealing surface of the casing.

A washer 24 has fingers 25 bent into the recesses 19 to lock the same to the bushing 16 and is engaged by a soft sealing packing 26 of resilient rubber-like material such as DuPrene, Neoprene, or synthetic elastic material. A washer 27 engages the other edge of this packing 26 while a spring 28 acts between the flange 23 and the washer 27 tending to force the sleeve 20 in one direction while it exerts pressure to expand the packing 26 by action in the other direction. This spring 28 is of the annular wavy type and is compressed between these two parts.

The packing 26 firmly engages one of the walls such as 17 and is provided with a lip 29 which extends radially away from the wall against which the body portion of the packing engages. In the case of Figure 1 this lip 29 extends inwardly. The lip 29 being relatively thin is very flexible and it opens by reason of its diagonal extent, to provide a V-shaped entrance 30 for the entrance of liquid to be sealed so that as the liquid enters the V 30 the pressure of the liquid will swing the lip 29 in hinge-like manner downwardly into firm engagement with the wall 22 of the sleeve and prevent the escape of any liquid therealong. The greater the pressure of the liquid the greater the force exerted on the lip while at the same time the extreme flexibility of this lip will press with no greater pressure than necessary to form the seal on the sleeve which slides relative to the wall 17. Thus but little retardment of the movement of the sleeve occurs by reason of this lip which forms the seal thereon. In the showing in Fig. 1, the shaft 10, the sleeve 20, the flange 14, are all so associated as to rotate with the shaft 10 while the casing designated generally 11 is the other member or part which is relatively stationary. In each instance the relative movement will occur along the very flexible lip of the packing between the sleeve and its concentrically arranged part.

In the modified arrangement shown in Fig. 3, the casing is designated 31 which constitutes one of the two members or relatively rotating parts which is provided with a ground surface 32 against which the seal occurs. The shaft 33 carries a flange 34 having structural work 35 mounted thereon while the axially movable sleeve is designated generally 36 and has a wall 37 extending axially which cooperates with the cylindrical wall of the shaft 33. The sealing face of the sleeve is designated 38, and presses against the sealing face 32 of the casing to provide the seal. The position of the sealing face 38 is such that there is a radially extending portion 39 of the sleeve against which pressure of the liquid to be sealed may act to in some measure balance the fluid pressure which is acting in the opposite direction. An annular washer 40 engages the flange 34 and is provided with a finger 41 extending into a recess therein to lock the same thereto. Another washer 42 engages the packing 43 while a spring 44 acts between the two washers to force the packing and through the packing the sleeve to the left as shown in Figure 3 to cause sealing engagement between the surfaces 32 and 38. The packing 43 has its body portion firmly engaging the walls 37 and 39 of the sleeve while it is pressed into engagement with these walls by the spring which forces the sleeve to sealing engagement. The lip 45 of this packing is pressed against the surface of the shaft 33. In this case the fluid engages the lip in a manner similar to that above explained to force the same into engagement with the shaft so as to seal the escape of liquid along the shaft and from the casing. The sleeve, the packing, the flange, and framework all rotate with the shaft relative to the stationary member or casing 31 as shown.

In the modification shown in Figure 4, the casing is designated generally 48 which constitutes one member and which has a removable face 49 associated therewith keyed as at 50 against rotation relative thereto. The other member or shaft 52 has a collar 53 shrunk onto it with a flange 54 extending radially therefrom. The sleeve 55 has a sealing face 56 and an axially extending wall 57 parallel to the axially extending collar 53. Soft packing 58 is positioned between the concentric cylindrical walls 53 and 57 with the body portion engaging the wall 53 while the lip portion 59 engages the sleeve of wall 57 which is slidably moved with reference thereto. A washer 60 engages the body of this soft packing while spring 61 acts between the inwardly extending flange 62 of the sleeve and the washer which engages the soft packing 58 to urge the sleeve in one direction and the packing in the other. In this case the sleeve provides its own liquid containing housing and the liquid serves to move the lip to sealing position and also acts upon the flange 62 of the sleeve which has such a differential of diameters on its opposite sides as to move it toward sealing position.

In Fig. 5 the casing is omitted. A flange 65 having a sealing face 66 is fixed to the shaft 67. A sleeve 68 with a sealing face 69 engages the sealing face and is carried in a shell 70 pressed into the casing. This shell is provided with an axially extending wall 71 parallel to the wall of the sleeve. A spring 72 acts against this wall and a washer 73 which in turn presses against the packing 74 urges it toward flange 75 of the sleeve to force the sleeve into sealing engagement and to also expand the packing. A finger 70' locks the sleeve in the shell against rotation.

The packing 74 consists of two annular body portions 76 and 77 with lips 78 and 79 which engage and move along the wall 71, that is these two packings move with the sleeve while their lips drag along the wall concentric with the sleeve. The lips are diagonally extending in opposite directions so that regardless of which side is low pressure or high pressure there will always be one lip which will be pressed into firm engagement with the axially extending wall 71 by a pressure which tends to escape in a direction to move the lip as desired.

In the modification shown in Fig. 6, the shaft is designated 80 and has a flange 81 firmly fixed thereto, which flange is provided with a sealing face 82. The casing is designated 83 and has an axially extending wall 84 concentric with the surface of the shaft. A sleeve 85 also has a wall 86 concentric with the wall 84 and is provided with a sealing face 87 to engage the sealing face 82 of the flange 81. A washer 88 has a finger 89 extending into a recess 90 of the casing and is engaged by a spring 91 which presses against the washer 92 engaging the body portion of the soft packing 93 to press this packing and in turn the sleeve into sealing position. The pressure tends to expand the packing and cause it to firmly engage the surface of the sleeve with which the packing moves. A lip 94 provided on this packing engages the wall 84 to move therealong. In this case the sleeve remains associated with the casing and as the casing does not rotate the sleeve does not rotate.

In Fig. 7 an application of the principles of this invention are shown with reference to a clutch. One of the parts is designated 100 and in this particular instance is the rotating part. The bushing 101 is keyed to this part as at 102 while a resilient compressible packing 103 is provided between the radially and axially extending parts of the bushing 101. The liquid to be sealed cannot escape about this packing 103. The casing 104 has an axially extending wall or surface 105, while the sleeve associated therewith is designated generally 106 and has an axially extending wall 107 with a sealing face 108 to engage the sealing face 109 on the bushing 101. A washer 110 has a finger 111 to extend into recess 112 in the casing while a spring 113 engages this washer and in turn another washer 114 which in turn engages the packing 115 so as to press the packing and through it the sleeve to sealing position while the soft packing is caused to engage the outer surface of the wall 107 of the sleeve. Two lips 116 and 117 are provided extending in opposite directions so as to firmly seal the escape of fluid whether there be a pressure in one direction or the other acting upon these lips which will occur where a vacuum and a pressure in a pump or other part alternate.

From the above it will appear that this invention is applicable regardless of which part rotates and which part is stationary of the two members and that it is also applicable to the inside or outside of a sleeve and applicable regardless of the direction in which pressure exists or whether it exists in one direction or the other direction alternately.

I claim:

1. In combination with a shaft seal having relatively rotating parts with a sealing face fixed on one part and an axially extending cylindrical wall on the other part with an axially movable but relatively non-rotatable sleeve carrying a cooperating sealing face associated therewith and presenting a concentric cylindrical wall spaced from the first said axially extending wall, a packing between said axially extending relatively axially movable walls exposed to the liquid to be sealed and firmly engaging one of said walls and provided with a lip sufficiently flexible to be movable by said liquid into engagement with the other of said walls to provide a seal between them.

2. In combination with a shaft seal comprising a casing part and a shaft part extending therefrom, one of said parts carrying a sealing face and presenting an axially extending cylindrical wall, a sleeve associated with the other part and axially movable with reference thereto and presenting a concentric cylindrical wall and provided with a sealing face to engage the sealing face of the other part to provide a seal between them, means for locking the sleeve against rotation relative to the part with which it is associated and a flexible soft packing between said walls and non-rotatable with reference to the sleeve and exposed to the liquid to be sealed and provided with a lip swingable radially by the pressure of the liquid to be sealed toward a surface with reference to which it is non-rotatably held but with reference to which there is axial movement.

FRANK BOTTOMLEY.